US009823076B2

(12) United States Patent
Guattari et al.

(10) Patent No.: US 9,823,076 B2
(45) Date of Patent: Nov. 21, 2017

(54) INTERFEROMETRIC SYSTEM WITH MULTIAXIAL OPTICAL FIBRE AND METHOD FOR PROCESSING AN INTERFEROMETRIC SIGNAL IN SUCH A SYSTEM

(71) Applicant: IXBLUE, Saint-Germain-en-Laye (FR)

(72) Inventors: Frederic Guattari, Aubervilliers (FR); Cedric Molucon, Saint Germain en Laye (FR); Sebastien Ferrand, Paris (FR); Eric Ducloux, Rueil Malmaison (FR)

(73) Assignee: IXBLUE, Saint-Germain (FR)

( * ) Notice: Subject to any disclaimer, the term of this patent is extended or adjusted under 35 U.S.C. 154(b) by 0 days.

(21) Appl. No.: 15/023,747

(22) PCT Filed: Sep. 23, 2014

(86) PCT No.: PCT/FR2014/052377
§ 371 (c)(1),
(2) Date: Mar. 22, 2016

(87) PCT Pub. No.: WO2015/044580
PCT Pub. Date: Apr. 2, 2015

(65) Prior Publication Data
US 2016/0231120 A1    Aug. 11, 2016

(30) Foreign Application Priority Data
Sep. 24, 2013   (FR) ..................... 13 59195

(51) Int. Cl.
*G01C 19/72*    (2006.01)
*G02B 6/293*    (2006.01)

(52) U.S. Cl.
CPC ......... *G01C 19/728* (2013.01); *G01C 19/721* (2013.01); *G02B 6/29347* (2013.01)

(58) Field of Classification Search
CPC ..... G01C 19/72; G01C 19/721; G01C 19/728
See application file for complete search history.

(56) References Cited

U.S. PATENT DOCUMENTS 5,133,600 A    7/1992  Schroder
5,294,972 A    3/1994  Kemmler
(Continued)

FOREIGN PATENT DOCUMENTS

DE    2941618    4/1981

OTHER PUBLICATIONS

International Search Report PCT/FR2014/052317 dated Mar. 11, 2015.

*Primary Examiner* — Jonathan Hansen
(74) *Attorney, Agent, or Firm* — Young & Thompson

(57) ABSTRACT

An interferometric system with multi-axis optical fiber and a method for processing an interferometric signal in such a system, the multi-axis interferometric system includes a light source (1); a plurality of N optical-fiber coils (11, 12), a first optical separation element (3) capable of splitting the source beam (100) into a first split beam (140) and a second split beam (240); shared phase-modulation element (4); a photodetector (2) and a signal-processing system (800). The N optical-fiber coils (11, 12) are connected in parallel, the coils having respective transit times T1, T2, . . . TN that all differ from one another, and the signal-processing system (800) is capable of processing the interferometric signal (720) detected by the shared photodetector (2) as a function of the respective transit times in the various coils.

19 Claims, 6 Drawing Sheets

(56) References Cited

U.S. PATENT DOCUMENTS

| | | | | |
|---|---|---|---|---|
| 5,719,674 | A | * | 2/1998 | Martin ................ G01C 19/728 356/462 |
| 5,818,589 | A | | 10/1998 | Scholz et al. |
| 9,518,826 | B2 | * | 12/2016 | Guattari ............... G01C 19/721 |
| 2012/0141062 | A1 | * | 6/2012 | Smith .................. G01C 19/726 385/3 |
| 2013/0050708 | A1 | * | 2/2013 | Bergh ................. G01C 19/728 356/459 |

* cited by examiner

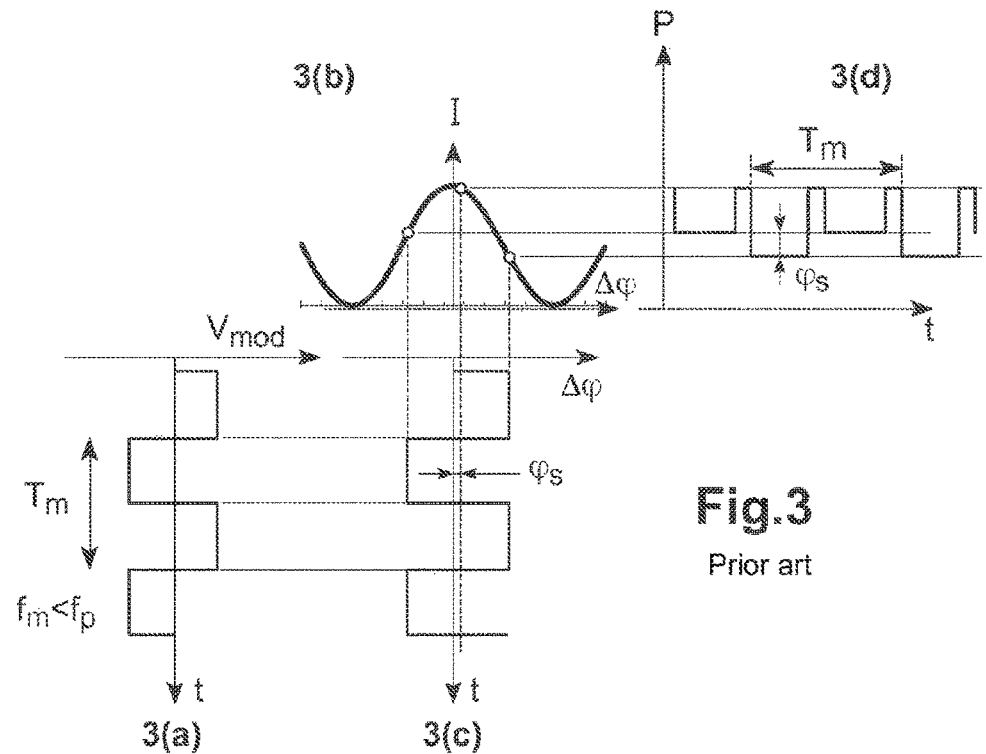
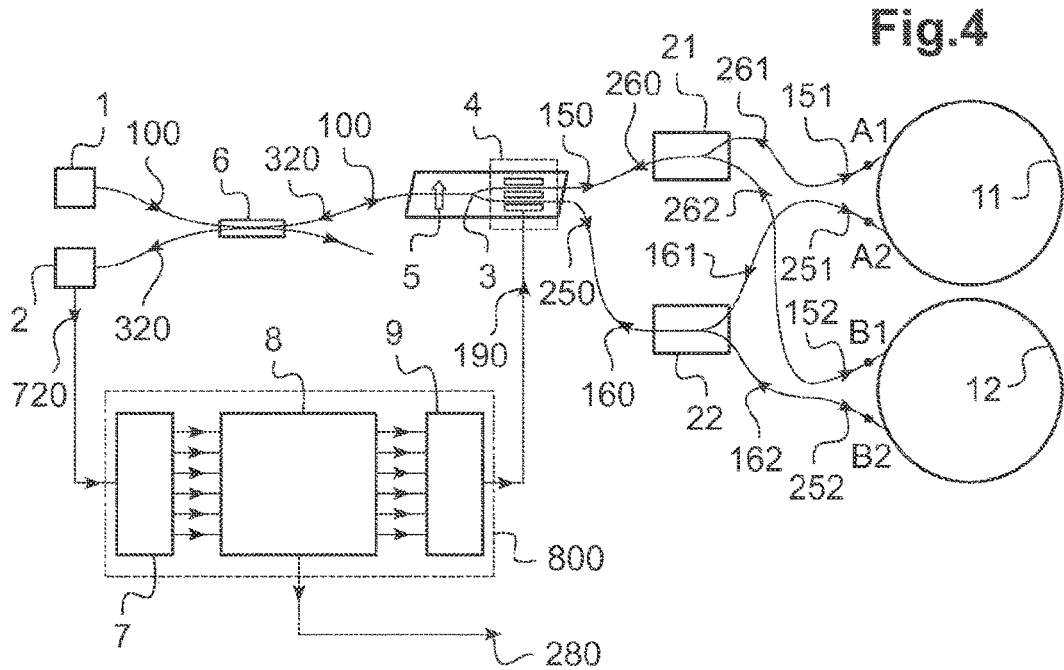

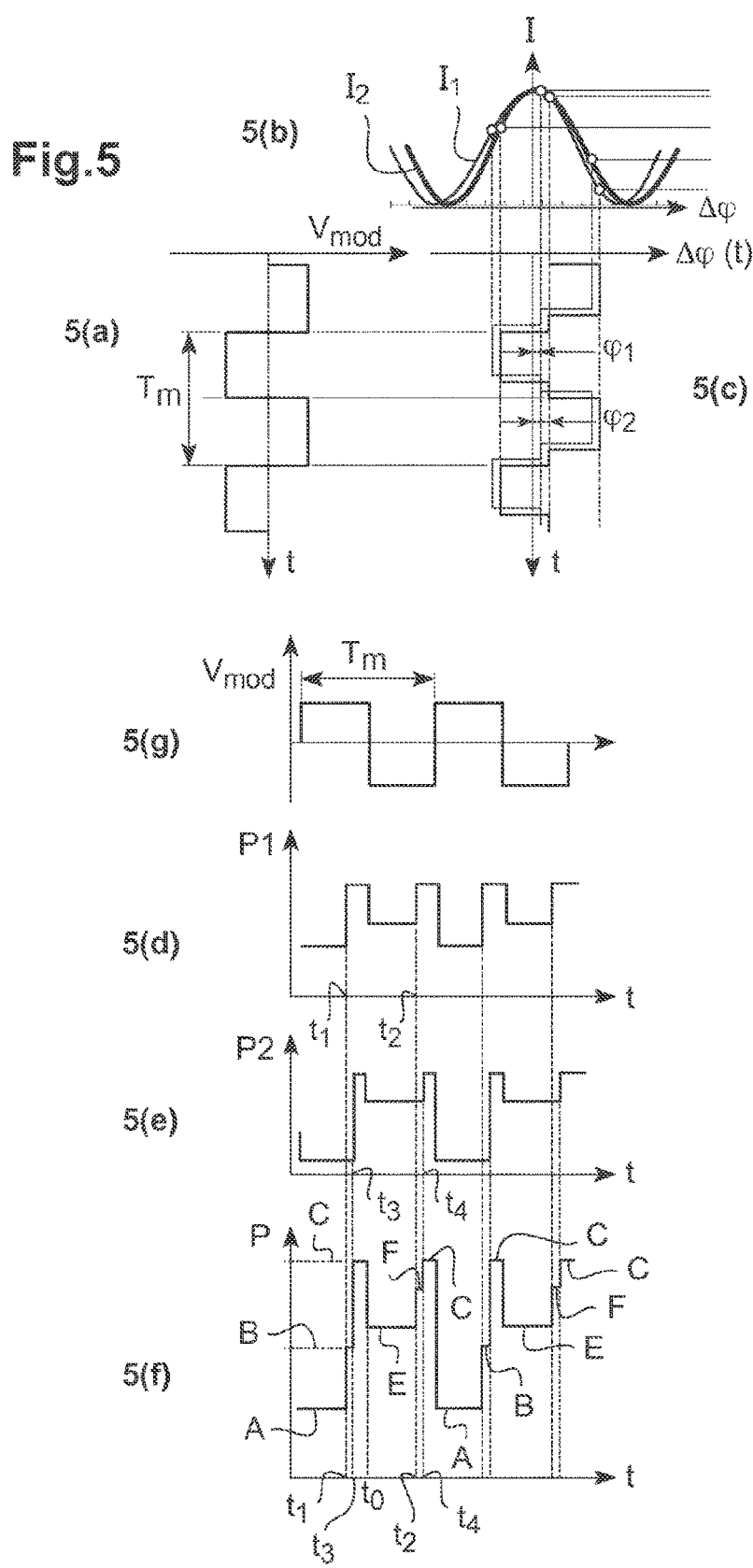

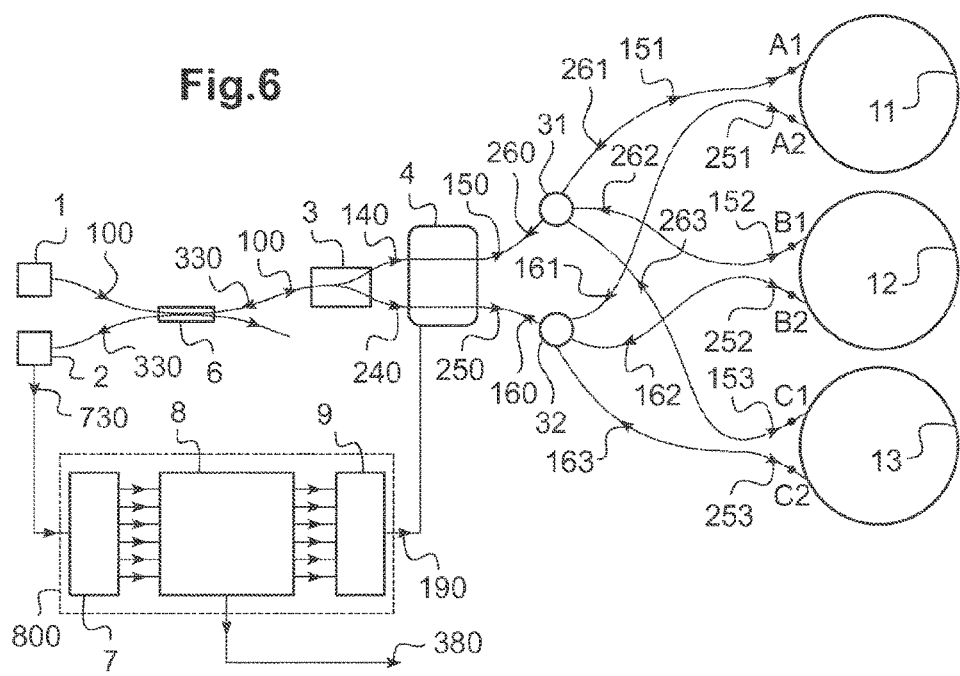
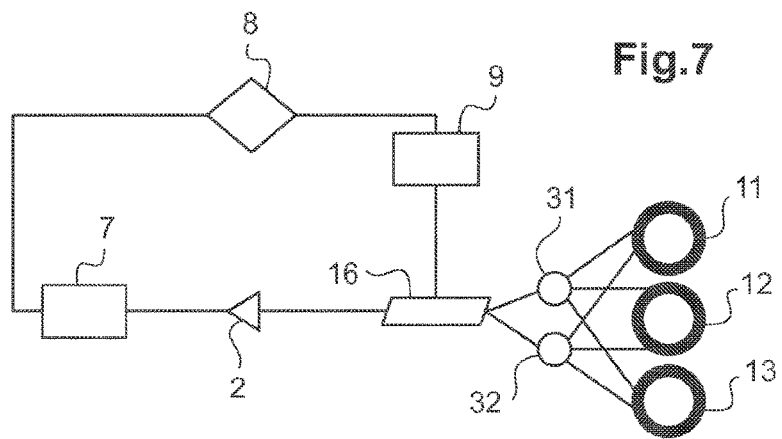

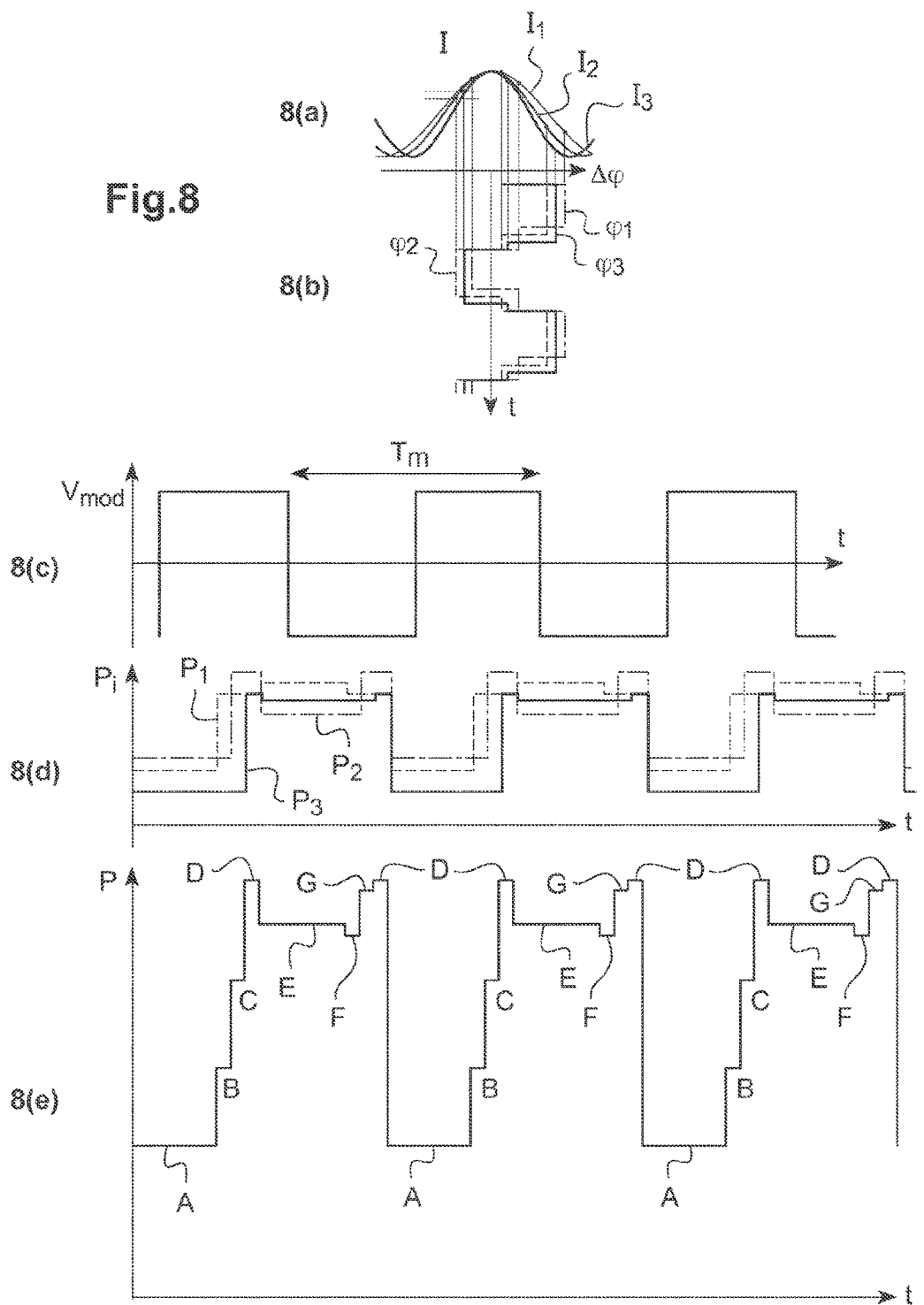

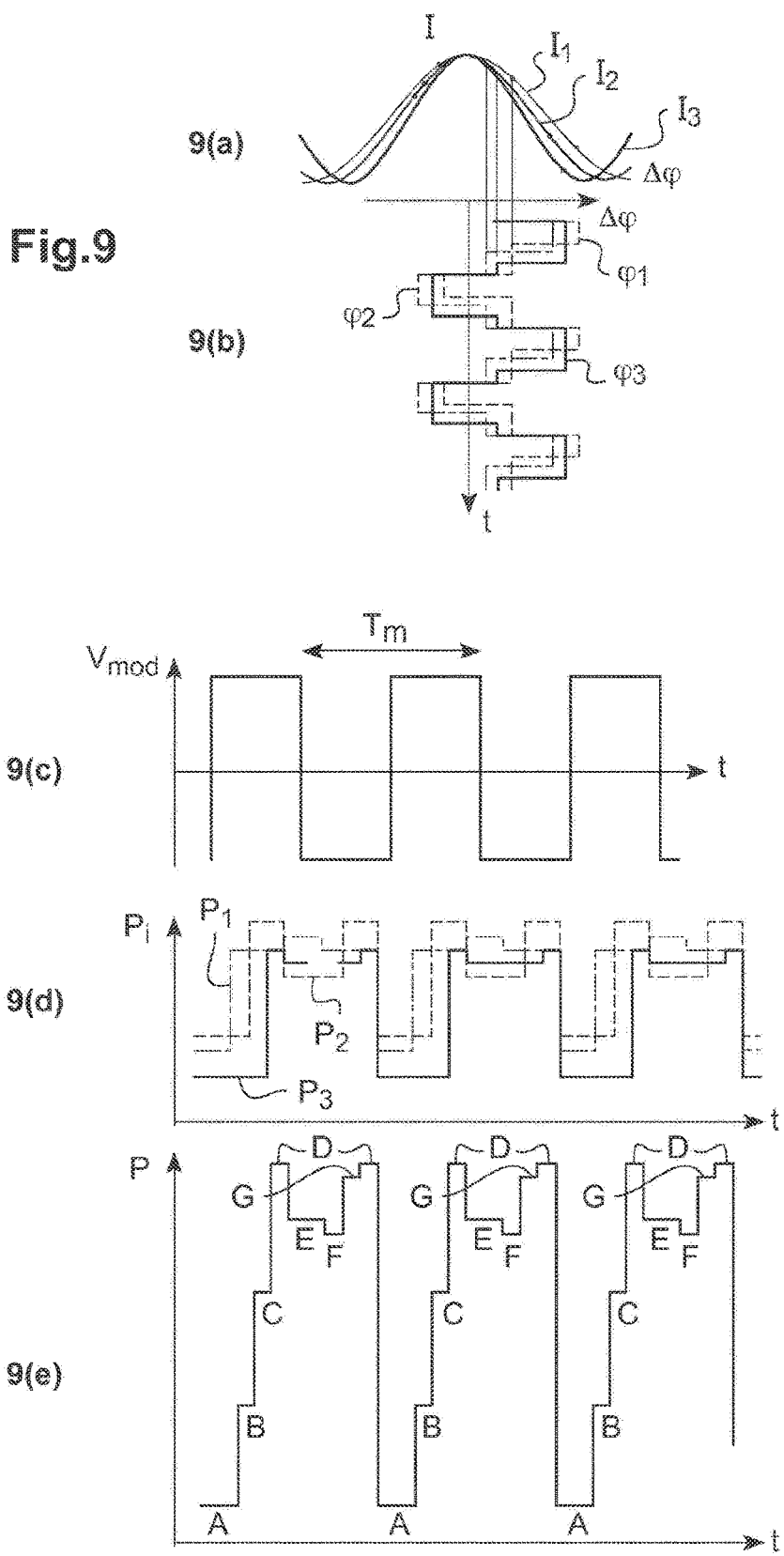

INTERFEROMETRIC SYSTEM WITH MULTIAXIAL OPTICAL FIBRE AND METHOD FOR PROCESSING AN INTERFEROMETRIC SIGNAL IN SUCH A SYSTEM

BACKGROUND OF THE INVENTION

Field of the Invention

The present invention relates to Sagnac-ring fiber optic interferometric systems. A Sagnac-ring interferometer allows in particular a measurement of rotation about the axis of the ring forming the optical path. Such interferometric systems find applications in particular in the fiber optic gyroscopes (or FOG, see "The Fiber optic gyroscope", H. Lefèvre, Artech house, 1993).

A multi-axis interferometric system includes several optical-fiber coils, for example three in number, integral with each other and the axis of which are arranged along different directions. Such a multi-axis interferometric system makes it possible to measure the rotations of the system about each of the axis of the different coils. Moreover, the number of optical-fiber coils may be increased to provide redundant information and to improve the performances of the system.

The simplest construction of a multi-axis interferometric system consists in arranging several interferometers operating in parallel with a single, shared light source, each interferometer comprising an optical modulator, an optical-fiber coil about an axis and a detector. The increase of the number of coils hence generally involves an increase of the number of optical and/or electronic components.

Description of the Related Art

Different architectures have been proposed for the purpose of reducing the size, the number of optoelectronic components and finally the cost of the multi-axis interferometric systems.

In particular, different architectures of multi-axis interferometric systems exist in which a single detector is connected to several optical-fiber coils.

The document U.S. Pat. No. 4,815,853 (H. Lefèvre) describes a three-axis fiber optic interferometric system implementing a shared source, three optical-fiber coils connected in series, a shared photodetector and a time multiplexing of the signals. In this series architecture, a first optical coupler connects the second fiber coil preferably to the middle of the first coil, and a second optical coupler connects the third coil preferably to the middle of the second coil. According to this document, coils of same length L are chosen and the intensity of the source is modulated with a gate function of duration $\tau$ and period of repetition $3\tau$, the source being switched on for the duration $\tau$ and switched off for a duration $2\times\tau$ at each period of repetition, where $\tau$ represents the transit time $\tau$ of the modulated beams in any one of the optical-fiber coils, being defined by the formula:

$$\tau = \frac{L}{v_g}$$

where $v_g$ represents the group velocity in the optical fiber. The photodetector receives respectively at the instant $t+\tau$, an interferometric signal corresponding to the optical path of the first coil, at the instant $t+2\tau$, an interferometric signal corresponding to an optical path comprising the first and the second coil, and at the instant $t+3\tau$, an interferometric signal corresponding to the optical path of the three series coils. A time demultiplexing of the signals makes it possible to calculate the relative rotation rate about each axis, by supposing that these speeds remain constant between the instants t, $t+2\tau$ and $t+3\tau$. The coil connection fibers make this device sensitive to the temperature gradient, liable to cause thermally induced non-reciprocities, due to the Shupe effect.

The document U.S. Pat. No. 5,033,854 (A. Matthews, G. Varty, J. Darling) describes a system of three fiber optic gyroscopes each having a distinct interferometric optical device and in which the three detectors are connected to a shared signal-processing electronic system comprising a time multiplexer, an analog-to-digital converter (or ADC) and a signal-processing system (or DSP). The multiplexer includes an electronic switch to select one of the electric signals coming from one of the different gyroscope towards the single exit (col. 4 L. 50-61 and FIG. 2a). A same modulation voltage is applied simultaneously to each of the individual phase modulators of each gyroscope (col. 4 L. 46-49). Each of the gyroscopes is sampled at a speed equal to $n \cdot Y$, where Y is the transit time in a coil. This electronic system performs a time division multiplexing.

The document U.S. Pat. No. 5,719,674 (P. Martin, T. Gaiffe, J. Morisse, P. Simonpietri, H. Lefèvre) describes a three-axis ring fiber optic interferometric system, wherein three fiber optic interferometers are connected to a shared source and to a shared detector. Each interferometer comprises an optical-fiber coil, a Y-junction coupler-separator and an optical phase modulator. A 3×3 coupler separates the source beam into three beams each directed towards an interferometer. The 3×3 coupler recombines the three interferometric signals to form the detected signal. The lengths of the optical-fiber coils being identical, the transit time is identical in all the coils. Different periodic phase modulations are applied to each coil. These phase modulations have a same modulation frequency $f_m = 1/T_m$ where $T_m$ is equal to $2\tau$, i.e. twice the common transit time and are time offset with respect to each other by a time interval $\delta t_1 = T_m/(2 \cdot N)$ for each of the N interferometers $I_i$. A signal processing makes it possible to demultiplex the detected signal to extract respectively from each time interval $\delta t_i$ the Sagnac phase-shift signal relative to one interferometer $I_i$. This device hence includes three independent interferometers connected to a same source, each having a specific modulation and a shared time-multiplexed detector that measures at each instant an interferometric signal coming from a single one of the different interferometers. This device requires a rated operation of the different optical modulators.

The document U.S. Pat. No. 5,294,972 describes a multiaxial rotation-rate sensor comprising several optical-fiber coils connected in parallel to a pulsed light source, an optical modulator and a photodetector, wherein the lengths of the optical-fiber coils are in ratios that are multiple from each other and wherein the signals corresponding to the different coils are distinguished either downstream from the photodetector by a time demultiplexing, or at the phase modulator, by application of a phase shift of $\pm\pi \cdot n$.

BRIEF SUMMARY OF THE INVENTION

One of the objects of the invention is to propose a multi-axis interferometric system architecture alternative to the prior architectures.

Another object of the invention is to propose a multi-axis interferometric system comprising a limited number of optoelectronic components so as to reduce the costs and the size of the system.

Still another object of the invention is to propose a signal processing method adapted to such a multi-axis interferometric system.

The invention will find a particularly advantageous application in the navigation or guidance systems on-board surface ships, underwater vehicles or spatial vehicles. More specifically, the invention will find applications in the multi-axis interferometric systems intended for applications in the spatial or nuclear fields, the cost of the procedures of qualification of the optoelectronic components leading to drastically reduce the number of electronic components by limiting the degradation of the system performances.

The invention more particularly relates to a multi-axis fiber optic interferometric system including a shared light source adapted to emit a source beam, a plurality of N optical-fiber coils, each coil forming a ring optical path about an axis; a first optical separating means adapted to spatially separate the source beam into a first split beam and a second split beam; shared phase-modulation means adapted to apply a time-modulated phase shift between the first and the second split beams and to form a first modulated beam and a second modulated beam; a shared photodetector and a shared signal-processing system.

According to the invention, the N optical-fiber coils are connected in parallel, so as to inject simultaneously a fraction of the first modulated beam at a first end of each coil and a fraction of the second modulated beam at a second end of each coil, said N optical-fiber coils having respective transit times T1, T2, . . . TN that are all different from each other; the first optical separation means being adapted to recombine said fractions of the first modulated beam and said fractions of the second modulated beam having travelled through the N coils in counter-propagating directions to form an interferometric beam, and the signal-processing system being adapted to process the interferometric signal detected by the photodetector as a function of the respective transit times T1, T2, . . . TN in the different coils.

In the present document, the notion of simultaneity of the modulation of the optical beams translates the fact that a same electro-optical modulation is applied with no phase shift at the entry of the N ring optical paths connected in parallel.

The multi-axis interferometric system of the invention advantageously makes it possible to determine, during a same period of modulation, the Sagnac phase shifts with respect to each of the axis of the different optical-fiber coils by using an extremely compact opto-electronic architecture, with no optical switch nor electronic switch.

According to a particular and advantageous embodiment, the multi-axis fiber optic interferometric system further comprises:
  a second optical separation means arranged between the shared light source and the shared photodetector;
  third optical separation means arranged on the optical path of the first modulated beam between the phase-modulation means and the first ends of each of the N optical-fiber coils;
  fourth optical separation means arranged on the optical path of the second modulated beam between the phase-modulation means and the second ends of each of the N optical-fiber coils;
  the third optical separation means and the fourth optical separation means each having at least one entry and N exits so as to transmit simultaneously and in parallel a fraction of the first modulated beam at the first end of each of the N optical-fiber coils and a fraction of the second modulated beam at the second end of each of the N optical-fiber coils and so that said fractions of the first modulated beam and said fractions of the second modulated beam propagate in opposite directions in each of said coils.

According to a particular and advantageous embodiment, the signal-processing system is adapted to record a series of at least 2*N components of the detected signal at determined instants as a function of the respective transit times T1, T2, . . . TN associated with each of the N optical-fiber coils, respectively, and to extract therefrom at least N Sagnac phase-shift measurements respectively associated with each of the N optical-fiber coils from said series of components.

According to various particular and advantageous aspects, the fiber optic interferometric system includes a planar integrated optical circuit including the first optical separation means, the shared phase-modulation means and the third and fourth optical separation means.

Advantageously, the first optical separation means includes a Y junction.

According to various particular and advantageous aspects, the fiber optic interferometric system includes a digital-to-analog converter adapted to apply a modulation voltage to the shared phase-modulation means so as to generate a modulated phase shift at a modulation frequency $f_m$.

According to a particular and advantageous embodiment, the third optical separation means, and respectively the fourth optical separation means, comprise one or several 2×2 couplers arranged in series, a 1×N coupler or a 3×3 coupler.

Advantageously, the transit times T1, T2 and T3 are defined as follows: $T1 \leq 0.9 \times T2$ and $1.1 \times T2 \leq T3$.

The invention also relates to a method for the interferometric measurement of a plurality of phase shifts in an interferometric system comprising N optical-fiber coils optically coupled in parallel to a shared source, a shared phase modulator and a shared detector, said N optical-fiber coils having respectively transit times T1, T2, . . . TN that are all different from each other, the method comprising the following steps:
  spatial separation of a source beam into a first split beam and a second split beam;
  application of a time-modulated phase shift between the first split beam and the second split beam to form a first modulated beam and a second modulated beam;
  spatial separation of the first modulated beam into N fractions of the first modulated beam and spatial separation of the second modulated beam into N fractions of the second modulated beam;
  simultaneous and parallel injection on the plurality of optical-fiber coils, respectively, of a fraction of the first modulated beam at the first end of each optical-fiber coil and of a fraction of the second modulated beam at the second end of said optical-fiber coil, so that each of said fractions of the first modulated beam and each of said fractions of the second modulated beam respectively travel through an optical-fiber coil in counter-propagating directions with, respectively, a different transit time T1, T2, . . . TN for each of the N optical-fiber coils;
  recombination of the N fractions of first modulated beam having each travelled through an optical-fiber coil to form a first recombined beam;

recombination of the N fractions of second modulated beam having each travelled through an optical-fiber coil to form a second recombined beam;

recombination of the first recombined beam and of the second recombined beam to form a time-modulated interferometric beam as a function of the respective transit times T1, T2, . . . TN in the different optical-fiber coils;

detection of the interferometric beam and generation of an interferometric electronic signal;

recording of at least 2*N components of the interferometric electronic signal at a series of at least 2*N instants as a function of the respective transit times T1, T2, . . . TN in the optical-fiber coils (11, 12, 13);

processing of the at least 2*N components of the interferometric electronic signal recorded at the previous step to deduce therefrom at least a plurality of N Sagnal phase-shift measurements respectively associated with each of the N optical-fiber coils.

The method of multi-axis interferometric measurement of the invention advantageously makes it possible to determine simultaneously and in parallel the Sagnac phase shift relative to several axes of optical-fiber coils, without optical switching nor electronic switching and with a simple misalignment matrix between the different axes. In other words, the misalignment matrix, describing the relations between each of the values provided by the sensor and each of the measurements that it is desired to perform, is more easily diagonalizable, with coefficients that are less dependent on the environmental parameters (temperature, rotation, etc. . . . ).

According to various particular and advantageous aspects of the method of the invention:

the step of application of a time-modulated phase shift comprises a rectangular-wave modulation at a modulation frequency $f_m$;

the modulation frequency $f_m$ is equal to the proper (or eigen) frequency $f_p$ of one of the optical-fiber coils, said coil having a transit time Ti, and the proper frequency being defined as follows: $f_p=1/(2·Ti)$;

the modulation frequency $f_m$ is lower than the proper frequency of all the optical-fiber coils; or the modulation frequency $f_m$ is higher than the proper frequency of all the optical-fiber coils, the modulation frequency being lower than:

$$f_m \leq \frac{1}{2 \times (T_{MAX} - T_{min})}$$

where $T_{MAX}$ represents the maximum of the transit times T1, T2, . . . TN of all the coils and $T_{min}$ represents le minimum of the transit times T1, T2, . . . TN of all the coils.

Particularly advantageously, the step of detection of the interferometric beam and/or of recording of at least 2*N components of the interferometric electronic signal comprises the detection and the recording of rising and/or falling fronts at instants determined as a function of the respective transit times T1, T2, . . . TN in the different optical-fiber coils and of the modulation frequency.

In a particular embodiment, the step of processing of said at least 2*N recorded components of the interferometric electronic signal comprises operations of linear combination of said at least 2*N components to deduce therefrom at least the plurality of N Sagnac phase-shift measurements associated with each of the N optical-fiber coils, respectively.

The present invention also relates to the characteristics that will be revealed in the following description and that will have to be considered in isolation or according to any technically possible combination thereof.

BRIEF DESCRIPTION OF THE DRAWINGS

The description, given only by way of non-limitative example, will allow a better understanding of how the invention may be implemented, with reference to the appended drawings, in which:

FIG. 3 shows an example of modulation at a frequency lower than the proper frequency of the FOG and the response of a FOG as illustrated in FIG. 1 to this modulation;

FIG. 4 schematically shows an architecture of interferometric system with two optical-fiber coils according to an exemplary embodiment of the invention, wherein two coils are connected in parallel to a source, a shared optical modulator and a shared detector;

FIG. 5 shows an example of modulation and the response to this modulation of a two-coil interferometric system as shown in FIG. 4;

FIG. 6 schematically shows an architecture of multi-axis interferometric system with three optical-fiber coils according to an exemplary embodiment of the invention, wherein three coils are connected in parallel to a source, a shared optical modulator and a detector;

FIG. 7 schematically shows the architecture of a three-axis interferometric system according to a preferred embodiment of the invention;

FIG. 8 shows an example of modulation and the response of a three-coil interferometric system as shown in FIG. 6, in the case where the modulation frequency is higher than the proper frequency of each of the three coils;

FIG. 9 shows another example of modulation and the response of a three-coil interferometric system as shown in FIG. 6, in the case where the modulation frequency is lower than the proper frequency of each of the three coils.

DETAILED DESCRIPTION OF THE PREFERRED EMBODIMENTS

Figure 1:
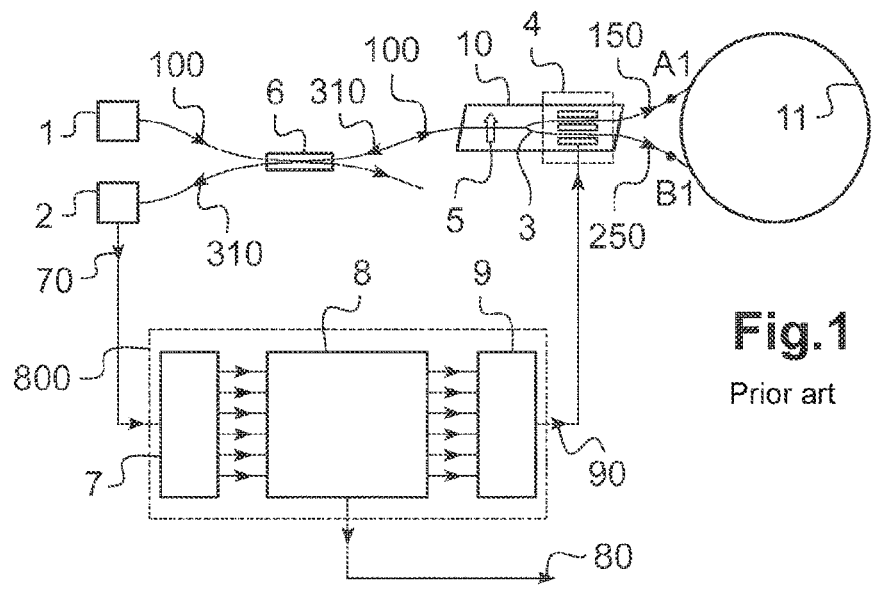
FIG. 1 schematically shows a single-axis interferometric system with one optical-fiber coil according to the prior art.
Figure 2:
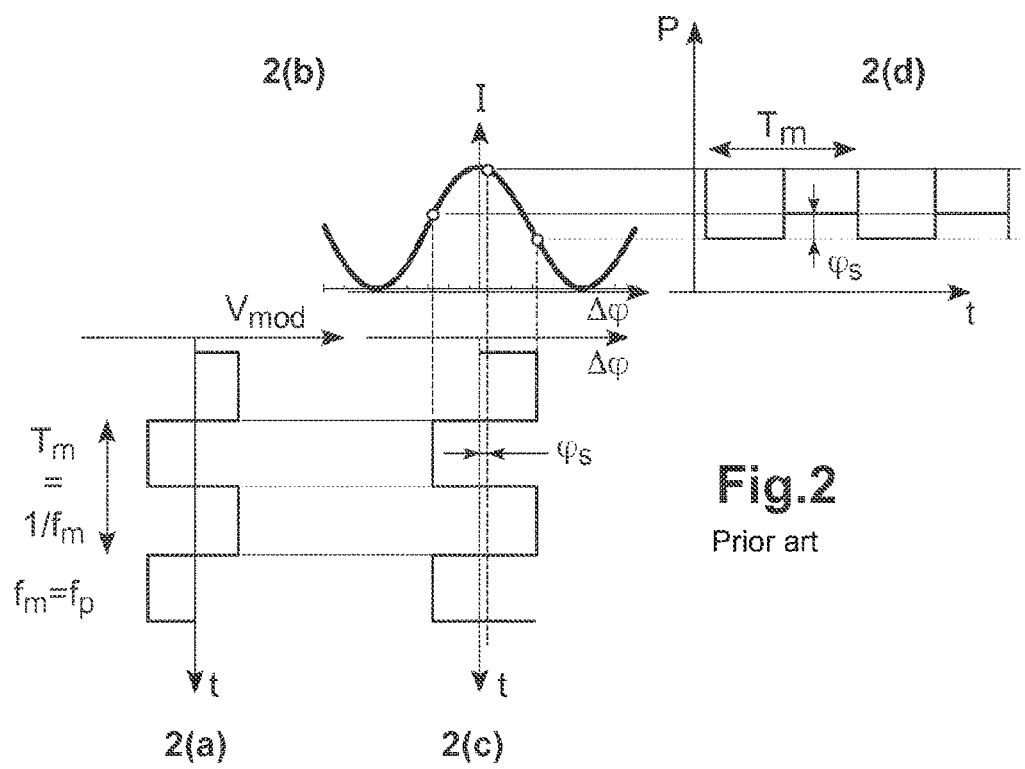
FIG. 2 shows an example of modulation at the proper frequency $f_p=1/(2\tau)$ of a FOG as illustrated in FIG. 1 and of light intensity response of the FOG to this modulation.

We will first detail the architecture of a single-axis interferometric system and the operation in modulation-demodulation of this interferometer in relation with FIGS. 1-3.

FIG. 1 schematically shows a single-axis interferometric system according to the prior art. This interferometric system includes a light source 1, an optical-fiber coil 11, a first optical coupler-separator 3, a second optical source separator 6, a photodetector 2 and a signal-processing system 800.

In the present document, the term beam applies to an optical wave and the term signal to an electric or electronic signal.

The light source 1 emits a source beam 100 having a decoherence length $L_c$. The light source 1 is preferably of broadband spectrum so as to limit the decoherence length to a few hundredths of micrometers. The light source 1 is for example a broad-spectrum laser source or laser diode (ASE source) having a decoherence length of the order of 600 micrometers. The light source 1 emits a continuous and not-pulsed radiation. Advantageously, the intensity of the radiation of the light source 1 is constant as a function of time.

The first optical coupler-separator 3, called a coil separator, spatially separates the source beam 100 into a first beam and a second beam. An optical phase modulator 4 makes it possible to modulate the phase shift between the first beam 150 and the second beam 250. The first modulated beam 150 is coupled to the first end A1 of the optical-fiber coil 11. Simultaneously, the second modulated beam 250 is coupled to the second end A2 of the optical-fiber coil 11. Hence, the first 150 and second 250 modulated beams propagate simultaneously in the optical-fiber coil 11 following opposite directions. The same optical coupler-separator 3 recombines the beams at the exit of the optical-fiber coil 11 to form an interferometric beam 310. The second optical source separator 6 directs the interferometric beam 310 exiting from the optical-fiber coil 11 towards the photodetector 2.

In the embodiment shown in FIG. 1, an integrated optical circuit 10 advantageously comprises a polarizer 5, the optical coupler-separator 3, which is a Y-junction coupler, and an optical modulator 4. The optical modulator 4 makes it possible to apply a modulated optical phase shift between the two counter-propagating beams. The integrated optical circuit 10 is for example consisted of a lithium niobate substrate on which are manufactured optical waveguides configured to form the polarizer 5 and the Y-junction optical separator 3. Electrodes deposited in the vicinity of the Y-junction branches make it possible to obtain a perfectly reciprocal optical phase modulator 4. Each of the two ends A1, A2 of the optical-fiber coil 11 is connected by a section of optical fiber to one end of the two waveguides at the exit of the integrated optical circuit 10.

Advantageously, fiber optic links connect the light source 1, the photodetector 2 and the integrated optical circuit 10 to the optical source separator 6.

The optical source separator 6 is for example consisted by a 2×2 directional coupler that makes it possible to direct the interferometric beam exiting from the optical-fiber coil 11 towards the photodetector 2.

The photodetector 2 converts the power of the interferometric beam 310 into an analog signal 70 transmitted to a signal-processing system.

The signal-processing system 800 comprises for example an analog-to-digital converter 7, a digital processor or DSP 8, for example of the FPGA type, and a digital-to-analog converter 9. The digital processor 8 makes it possible to extract a rotation signal 80 in a digital output. The digital-to-analog converter 9 makes it possible to apply a modulation voltage 90 to the optical phase modulator 4.

The optical intensity of the interferometric beam is a cosine function of the phase shift accumulated between the two counter-propagating waves during the propagation in the coil (FIG. 2b). In the absence of a non-reciprocal effect, this phase shift is null. Due to the Sagnac effect, the response of the interferometer depends on the non-reciprocal phase shift between the two counter-propagating waves. In particular, during a rotation of the interferometer about the axis of the optical-fiber coil 12, a Sagnac phase shift $\phi_s$ proportional to the rotation rate appears.

The techniques, well known by the one skilled in the art, of phase modulation in fiber optic interferometers are used to improve the sensitivity and the linearity of the interferometer response to the phase shift due to the Sagnac effect.

The implementation of a phase modulation $V_{mod}$ in the form of a rectangular-wave of amplitude of for example ±π/2, hence makes it possible to generate a time-modulated signal.

A time-demodulation processing of the detected signal makes it possible to extract a signal representative of the phase shift due to the Sagnac effect.

FIG. 2 illustrates the effect of a rectangular-wave modulation on the measurement of the Sagnac-effect phase shift.

FIG. 2(a) shows, as a function of time t, the modulation voltage $V_{mod}$ applied to the optical phase modulator 4 of a ring interferometer, as shown in FIG. 1. The modulation frequency $f_m$ is herein chosen equal to the proper frequency $f_p$ of the ring interferometer, where $f_p$ is defined as follows:

$$f_p = 1/(2\tau)$$

where τ represents the transit time of a modulated wave propagating in the coil at the group velocity (or group transit time).

FIG. 2(b) shows the intensity of the interferometric beam as a function of the phase shift Δφ between the two counter-propagating waves. FIG. 2(c) shows the optical phase-shift at the exit of the interferometer in presence of the modulation $V_{mod}$ and of a Sagnac phase shift $\phi_S$: this phase shift, modulated as a function of time at the modulation frequency $f_m$, is equal to ±π/2+$\phi_S$. However, the photodetector 2 does not measure directly the phase shift at the exit of the interferometer, but measures the power P of the detected interferometric signal 70. FIG. 2(d) shows the power P of the signal measured at the exit of the interferometer as a function of time. At each period of modulation $T_m$, the measured signal conventionally shows two plateaus, separated by peaks that correspond to the change of phase of the applied modulation. The difference between the two values of power is representative of the non-reciprocal phase shift due to the Sagnac effect $\phi_s$.

The modulated interferometric signal detected in FIG. 2(d) shows two levels of signal that are equal to each other when the interferometer is at rest, and that are offset in presence of a Sagnac-effect phase shift. At the time of the change of sign of the modulation, the detected signal crosses zero, which produces the peaks of FIG. 2(d). A signal processing is generally used to suppress these peaks and to measure the difference between the two levels of signal linked to the two half-periods of modulation, respectively. This difference is representative of a Sagnac-effect phase shift $\phi_s$.

FIG. 3 shows the implementation of a rectangular-wave phase modulation at a modulation frequency $f_m$ lower than the proper frequency $f_p$ of a single-axis ring interferometer. FIG. 3(a) shows the modulation voltage $V_{mod}$ applied as a function of time t; FIG. 3(b) shows the intensity of the interferometric beam as a function of the phase shift Δφ between the two counter-propagating waves; FIG. 3(c) shows the phase shift Δφ as a function of time t and FIG. 3(d) shows the power of the detected interferometric signal as a function of time t.

In the case of FIG. 3, the modulation voltage $V_{mod}$ applied to the optical phase modulator 4 is a periodic voltage of period $T_m$ and in the form of a rectangular-wave. In this example, the modulation frequency $f_m$ is lower than the proper frequency of the interferometer:

$$f_m < 1/(2\tau)$$

where τ represents the transit time in the coil 11.

Compared to FIG. 2(d), at each period of modulation $T_m$, the detected interferometric signal in FIG. 3(d) also includes two levels separated by bands broader than the peaks of FIG. 2(d). A signal processing makes it possible, at each period of modulation $T_m$, to measure the difference between the two levels of signal, this difference being representative of a Sagnac-effect phase shift $\phi_s$.

The techniques of modulation described in relation with FIGS. 2 and 3 are applied to an interferometric system with only one optical-fiber coil.

Other types of modulation than a rectangular-wave modulation, for example a sinusal modulation, may be implemented on an interferometric system as illustrated in FIG. 1. In this case, the signal-processing system is adapted to process the detected signal as a function of the applied modulation so as to extract the Sagnac-effect phase shift of the ring interferometer.

In a conventional multi-axis interferometric system comprising several fiber optic interferometers connected to a same source and possibly a same detector, each interferometer includes an own phase modulator and a specific method of modulation-demodulation is implemented on each interferometer.

Two-Axis Interferometric Device

FIG. 4 schematically shows a first embodiment of the invention in an interferometric system architecture comprising two optical-fiber coils 11 and 12. The same elements appearing in FIG. 1 are denoted by the same reference signs. In particular, the system of FIG. 4 includes shared optical components: a light source 1, a photodetector 2 and an optical phase modulator 4.

The system of FIG. 4 includes a first optical-fiber coil 11 and a second optical-fiber coil 12. The first optical-fiber coil 11 has a first end A1 and a second end A2. The second optical-fiber coil 12 has a first end B1 and a second end B2.

Two coils 11 and 12 having different transit times, respectively T1 and T2, are chosen. For example, the coils are manufactured from identical optical fibers, but have different lengths. In the preferred embodiment, the difference of length between the two coils is equal to at least 10% of the total length of the optical-fiber coil. In a variant, optical-fiber coils having different dispersion properties are chosen so that the two coils have different respective transit times.

The interest is herein about the transit time of the modulation of the signals, at the modulation frequency $f_m$, in the different optical-fiber coils, and not about the transit time of a non-modulated optical beam in the optical-fiber coils. The transit time of the modulation is determined by the group velocity in each of the optical-fiber coils.

As in the single-axis system of FIG. 1, the multi-axis interferometric system of FIG. 4 also includes a first optical coupler-separator 3 and a second optical source separator 6. The first optical coupler-separator 3 spatially separates the source beam 100 into a first split beam and a second split beam.

The optical modulator 4 applies a time-modulated optical phase shift between the first split beam and the second split beam, so as to generate a first modulated beam 150 and the second modulated beam 250 that remain spatially separated before being injected into the optical-fiber coils.

The second optical source separator 6 directs towards the photodetector 2 an interferometric beam 320 exiting from the first optical separator 3 and propagating in the opposite direction to that of the source beam 100.

The multi-axis interferometric system of FIG. 4 further includes a third optical separator 21 arranged on the optical path of the first modulated beam 150 and a fourth optical separator 22 arranged on the optical path of the second modulated beam 250, and more particularly between the optical modulator 4 and the ends of the optical-fiber coils 11 and 12.

Advantageously, for a system with two optical-fiber coils 11 and 12, the third and/or fourth optical separator includes an optical separator with one entry and two exits. An optical separator with one entry and two exits may be consisted of a Y-junction coupler or a 2×2 evanescent-field fiber optic coupler in which only one of the two entries is used.

The path of entry of the third optical separator 21 is connected by optical fiber to an exit of the optical phase modulator 4 and the path of entry of the fourth optical separator 22 is connected by optical fiber to another exit of the optical phase modulator 4.

One of the two optical paths of exit of the third optical separator 21 is connected to a first end A1 of the first optical-fiber coil 11. The other optical path of exit of the third optical separator 21 is connected to a first end B1 of the second optical-fiber coil 12.

Similarly, one of the two optical paths of exit of the fourth optical separator 22 is connected to the second end A2 of the first optical-fiber coil 11. The other optical path of exit of the fourth optical separator 22 is connected to the second end B2 of the second optical-fiber coil 12.

Hence, the third optical separator 21 spatially separates the first modulated beam 150 into a first fraction of the first modulated beam 151 and a second fraction of the first modulated beam 152. The first fraction of the first modulated beam 151 is injected at the first end A1 of first optical-fiber coil 11. Simultaneously, the second fraction of the first modulated beam 152 is injected at the first end B1 of the second optical-fiber coil 12. The first fraction of the first modulated beam 151 and the second fraction of the first modulated beam 152 are hence applied simultaneously and in parallel at the first end A1, respectively B1, of each optical-fiber coil 11, respectively 12. Preferably, the third optical separator 21 is equi-distributed in power so that the first fraction of the first modulated beam 151 and the second fraction of the first modulated beam 152 have the same amplitude. However, a difference of amplitude between the modulated beams 151 and 152 does not alter noticeably the operation of the interferometric system.

Similarly, the fourth optical separator 22 spatially separates the second modulated beam 250 into a first fraction of the second modulated beam 251 and a second fraction of the second modulated beam 252. The first fraction of the second split beam 251 is applied at the second end A2 of the first optical-fiber coil 11. Simultaneously, the second fraction of the second modulated beam 252 is applied at the second end B2 of the second optical-fiber coil 12. The first fraction of the second modulated beam 251 and the second fraction of the second modulated beam 252 are hence applied simultaneously and in parallel at the second end A2, respectively B2, of each optical-fiber coil 11, respectively 12. Preferably, the fourth optical separator 22 is equi-distributed in power so that the first fraction of the second modulated beam 251 and the second fraction of the second modulated beam 252 have the same amplitude.

Hence, the first fraction of the first split beam 151 and the first fraction of the second split beam 251 travel through the first coil 11 in counter-propagating directions. Simultaneously, the second fraction of the first split beam 152 and the second fraction of the second split beam 252 travel through the second coil 12 in counter-propagating directions.

The fourth optical separator 22 receives, on the one hand, from the second end A2 of the first coil 11, the first fraction of the first split beam 161 having travelled through the first coil 11 and, on the other hand, from the second end B2 of the second coil 12, the second fraction of the first split beam 162 having travelled through the second coil 12. The fourth optical separator 22 recombines by superimposition these two beams 161, 162 having travelled through the first coil 11 and the second coil 12, respectively, and forms a first recombined beam 160. Coils are chosen, which have a difference of transit time |T2−T1| corresponding to a difference of optical path in the optical fiber higher than the decoherence time of the source, so that the beams 161 and 162 do not interfere with each other during recombination by the optical separator 22.

The third optical separator 21 receives, on the one hand, at the first end A1 of the first coil 11, the first fraction of the second split beam 261 having travelled through the first coil 11 and, on the other hand, at the first end B1 of the second coil 12, the second fraction of the second split beam 262 having travelled through the second coil 12. The third optical separator 21 recombines by superimposition these two beams 261, 262 having travelled through the first coil 11 and the second coil 12, respectively, and forms a second recombined beam 260. For the same reason as detailed in the previous paragraph, the beams 261 and 262 do not interfere with each other during recombination by the optical separator 21.

The first optical coupler-separator 3 receives the recombined beam 160 and the recombined beam 260. The optical coupler-separator 3 superimposes the recombined beams 160 and 260. More precisely, the coupler-separator 3 recombines on the one hand the beams 151 and 251 having travelled through the first coil with a transit time T1 in opposite directions, and on the other hand the beams 152 and 252 having travelled through the second coil 12 with a transit time T2 in opposite directions, to form a single interferometric beam 320. The second optical source separator 6 directs the interferometric beam 320 exiting from the two optical-fiber coils 11 and 12 towards the photodetector 2. The interferometric beam 320 is hence consisted by the sum of an interferometric beam associated with the first coil 11 and of another interferometric beam associated with the second coil 12, which do not interfere with each other, due to the difference of transit time between the two coils. The detector transmits a detected signal 720 to the signal processing system 800. The processing system analyses and decomposes the detected signal 720 to extract a measurement 280 of the Sagnac phase shift associated with each of the optical-fiber coils.

A signal-processing system 800 comprises an analog-to-digital converter or ADC 7, a processor of the DSP type 8, for example a FGPA, and a digital-to-analog converter or DAC 9. The ADC digitizes the electric signal coming from the detector 2. The DSP 8 is adapted to process the digitized signal 720 as a function of the respective transit times T1 and T2 and to extract therefrom a series of measurements 280 comprising a measurement of the Sagnac phase shift associated with the first coil 11 and a measurement of the Sagnac phase shift associated with the second coil 12. The DAC 9 applies a modulation voltage 190 to the phase modulator 4.

Method of Modulation-Demodulation in a Two-Axis Interferometric System

FIG. 5 shows the implementation of a method of modulation and demodulation on a multi-axis interferometric system as described in relation with FIG. 4.

FIG. 5(a) shows, as a function of time t, the modulation voltage $V_{mod}$ applied to the optical modulator 4 to introduce a time-modulated optical phase shift between the first modulated beam 150 and the second split beam 250. Advantageously, the modulation is a rectangular-wave modulation having a modulation frequency $f_m$ and, equivalently, a period of modulation $T_m = 1/f_m$.

In a first embodiment, illustrated in FIG. 5, the modulation voltage $V_{mod}$ has a modulation frequency $f_m$ lower than the proper frequency $f_p$ of each of the two coils 11, 12 and a cyclic ratio of 1/2.

Let's note T1 the transit time in the first coil 11 and, respectively, T2 the transit time in the second coil 12. By way of example, the first coil 11 is shorter than the second coil 12, so that T1<T2.

It is chosen a modulation frequency $f_m$ lower than the proper frequency of each of the two coils, defined as follows:

$$f_1 = \frac{1}{2 \times T1}$$

and $$f_2 = \frac{1}{2 \times T2}.$$

FIG. 5(b) shows the intensity $I_1$ of the interferometric signal as a function of the phase shift $\Delta\phi_1$ between two counter-propagating waves in the first coil 11 and the intensity $I_2$ of the interferometric signal as a function of the phase shift $\Delta\phi_2$ between two counter-propagating waves in the second coil 12. In other words, the curve $I_1$ represents the response of the fiber optic gyroscope formed of the first coil and the curve $I_2$ represents the response of the fiber optic gyroscope formed of the second coil. The first coil 11 is sensitive to a Sagnac phase shift $\phi_1$ about its axis; the second coil 12 is sensitive to a Sagnac phase shift $\phi_2$ about its axis. The first coil 11 being shorter than the second coil 12, the sensitivity of the first coil 11 is lower than the sensitivity of the second coil 12.

FIG. 5(c) shows, as a function of time t, the Sagnac phase shift $\phi_1$ about the axis of the first coil 11 and the Sagnac phase shift $\phi_2$ about the axis of the second coil 12. The transit time T1 in the first coil being different from the transit time T2 in the second coil, for a same modulation $V_{mod}$ applied to the beams travelling through the two coils, the Sagnac phase-shift signals $\phi_1$ about the first coil 11 and $\phi_2$ about the second coil are time offset proportionally to the difference of transit time. More precisely, the first coil 11 being shorter than the second coil 12, the Sagnac phase shift $\phi_1$ of the first coil 11 occurs before the Sagnac phase shift $\phi_2$ of the second coil 12.

The invention takes advantage of the delay line operation of a Sagnac ring fiber optic interferometer. The modulation voltage applied to the shared phase modulator shows periodically rising fronts at the instants t=0, $T_m$, . . . , and falling fronts at t=$T_m/2$, $3\tau_m/2$ . . . . These rising or falling fronts of modulation are herein liken to pulses used to sound during a same modulation period and in parallel the two optical-fiber coils. The first coil 11 responds to a pulse of modulation with a delay time equal to the transit time T1. Similarly, the second coil 12 responds to a modulation pulse with a delay time equal to the transit time T2. The transit times T1 and T2 being distinct, the response of the first coil arrives to the detector before the response of the second coil.

Coils 11 and 12 are chosen, which have a sufficient difference of transit time |T2−T1| with respect to the maximum speed of electronic processing of the signals, which is determined by the signal detection and processing system. More precisely, the minimum difference of transit time between two optical-fiber coils is chosen so as to be higher than the response time of the signal-processing electronic system in order to make it possible to time separate the signals associated with each of the optical-fiber coils. The response time of the processing electronic system is of the order of the MHz. The phase modulation frequency $f_m$ is in general of the order of a few hundreds of kHz.

It is hence possible to detect separately in time the interferometric signal associated with the first coil and the interferometric signal associated with the second coil, although these two interferometric beams are optically superimposed in intensity and are detected by a single and same detector.

Hence, FIG. 5(g) shows the chronogram of the modulation voltage, respectively FIG. 5(d) the chronogram of the power P1 of the interferometric signal of the first coil, FIG. 5(e) the chronogram of the power of the interferometric signal of the second coil, and FIG. 5(f) the chronogram of the power of the detected interferometric signal that is the sum of the powers P1 and P2.

As illustrated in FIG. 5(g), a rectangular-wave phase modulation is applied simultaneously at the entry of the two coils with a period $T_m$.

Advantageously, 1+2*2 acquisitions, i.e. 5 acquisitions, per period of modulation are performed for a system with two optical-fiber coils. The time position of these acquisitions is determined by the position of the fronts and is not regularly distributed over the period of modulation. The rising and/or falling front detection mode is used to trigger the acquisitions and to record the instant of arrival and the height of each rising and/or falling front.

It is observed on the power signal P1 (see FIG. 5(d)), a first rising front at the instant t1=T1 (modulo $T_m$) and a second rising front at the instant t2=($T_m/2$+T1) (modulo $T_m$). The Sagnac phase shift $\phi_1$ linked to the first coil 11 is equal to the difference between the height of the first rising front at the instant t1 and of the second rising front at the instant t2.

Similarly, it is observed on the power signal P2 (see FIG. 5(e)), a first rising front at the instant t3=T2 (modulo $T_m$) and a second rising front at the instant t4=($T_m/2$+T2) (modulo $T_m$). The Sagnac phase shift $\phi_2$ linked to the second coil 12 is equal to the difference between the height of the first rising front at the instant t3 and of the second rising front at the instant t4.

However, the detector 2 receives at each instant the sum of the power P1 and of the power P2.

FIG. 5(f) shows the power of the detected interferometric signal that is the superimposition of the power P1 and of the power P2. The transit times T1 and T2 being separated, it is observed a first series of rising fronts at the instants t1=T1 and t3=T2, then a falling front, and a second series of rising fronts at the instants t2=($T_m/2$+T1) and t4=($T_m/2$+T2). The transit times T1 and T2 in the coils being different, the electronic system of detection may be adapted to record in the detected signal two rising fronts at the determined instants t1, t3, then a falling front at an instant t0 and finally two rising fronts t2 and t4.

The detected power P changes of level at the following instants:
at the instant t1, P passes from a level A to a level B;
at the instant t3, P passes from a level B to a level C;
at the instant t0, P passes from a level C to a level E;
at the instant t2, P passes from a level E to a level F;
at the instant t4, P passes from a level F to a level C.

The detected interferometric signal is not recorded at predetermined instants or a predefined frequency, but at instants t0, t1, t2, t3, t4 that are triggered by the arrival of rising and/or falling fronts to the detector.

The processing system makes it possible to extract from the measurements of the levels A, B, C, D, E and F, for example via linear combinations, a measurement of the Sagnac phase shift $\phi_1$ in the first coil 11 and a measurement of the Sagnac phase shift $\phi_2$ linked to the second coil 12.

For example, the signal-processing system is configured to calculate the height difference of the fronts measured at the instants t1 and t2 to deduce therefrom a measurement of the Sagnac phase shift $\phi_1$ linked to the first coil 11, and respectively the height difference of the fronts measured at the instants t3 and t4 to deduce therefrom a measurement of the Sagnac phase shift $\phi_2$ linked to the second coil 12.

It can be noticed that the measurements of the second coil are independent from the measurements of the first coil. It ensues therefrom a relatively simple misalignment matrix between the two axes respectively associated with the two coils, contrary to a configuration of a multi-axis system where the optical-fiber coils are connected in series and where the misalignment matrix proves to be complex.

The upper limit on the difference between the transit times of the two coils is such that:

$$T2-T1 \leq T_m/2.$$

The signal-processing method hence takes advantage of the different transit times of the different coils to separate in time the response of each optical-fiber coil.

Hence, from a single source 1, a shared phase modulator 4 and single detector 2, the device and the method of the invention make it possible to extract two measurements of Sagnac phase shift related to two optical-fiber coils 11 and 12 connected in parallel.

Complementary, the processing of the data advantageously makes it possible to measure one or several other parameters in addition to the Sagnac phase shifts, as for example the voltage Vpi applied to the phase modulator to produce a phase shift of Pi radian or the proper frequency of the optical-fiber coils.

The interferometric systems and methods of acquisition of an interferometric signal of the prior art generally operate at a fixed frequency of acquisition, for example by sampling the detected signal over the period of modulation. On the contrary, the system and the method of acquisition of the multi-axis interferometric signal described in relation with FIGS. 4 and 5 is function of the transit time, in other words the delay, of each coil and not of a frequency associated with each coil.

The case illustrated in FIG. 5 corresponds to a modulation frequency $f_m$ lower than the proper frequency of the two coils.

In a particular and advantageous embodiment, it is possible to apply a closed-loop control to the Sagnac phase shift of one of the optical-fiber coils.

According to another embodiment, it is chosen a modulation frequency $f_m$ higher than the proper frequencies of the different coils. This operation makes it possible to exploit the full dynamic of the multi-axis interferometric system. The limit of modulation frequency is defined as follows:

$$f_m 1/(2 \cdot (T2-T1)).$$

In another embodiment, it is also possible to choose the modulation frequency $f_m$ equal to the proper frequency of one of the coils:

$$f_m = \frac{1}{2 \times T1}$$

or $$f_m = \frac{1}{2 \times T2}.$$

This embodiment is particularly advantageous because it makes it possible to limit the Kerr effect in the coil having a proper frequency corresponding to the modulation frequency $f_m$. For that purpose, it is desirable not to deviate too much from the proper frequency of the different coils. Hence, the modulation frequency is advantageously chosen equal to the proper frequency of an optical-fiber coil, and the difference of transit time so that the frequency of the other coil is close, for example ±10%, of the modulation frequency.

In the case where it is desired to obtain an interferometric system having a sensitivity of the same order on the two optical-fiber coils, a small difference of transit time between the two optical-fiber coils is chosen.

On the contrary, in a system where a lower sensitivity is accepted on the first coil and where a maximum sensitivity is desired on the second coil, T1<<T2 is chosen. Such a configuration makes it possible to favour an axis with respect to another axis from the point of view of the bias performances or of the scale factor performances.

Other types of modulation, for example a rectangular-wave modulation of cyclic ratio different from 1/2, may be implemented in an interferometric measurement system and method as illustrated in FIGS. 4-5. In this case, the signal-processing system is adapted to process the detected signal as a function of the applied modulation so as to extract the Sagnac-effect phase shift of each coil of the interferometer.

Three-Axis Interferometric Device

FIG. 6 schematically shows another embodiment of an interferometric system architecture comprising three optical-fiber coils 11, 12 and 13. The same elements appearing in FIGS. 1 and 4 are denoted by the same reference signs. In particular, the system of FIG. 6 includes a shared light source 1, a shared photodetector 2 and a shared optical phase modulator 4.

As in the two-axis system of FIG. 4, the three-axis interferometric system of FIG. 6 also includes a first optical coupler-separator 3 and a second optical source separator 6. The first optical coupler-separator 3 spatially separates the source beam 100 into a first split beam 140 and a second split beam 240. The second optical source separator 6 directs towards the photodetector 2 an interferometric beam 320 exiting from the first optical separator 3 and propagating in the direction opposite to that of the source beam 100.

The optical modulator 4 makes it possible to apply a time-modulated optical phase shift between the first split beam 140 and the second split beam 240 and to generate a first modulated beam 150 and a second modulated beam 250.

The system of FIG. 6 includes a first optical-fiber coil 11, a second optical-fiber coil 12 and a third optical-fiber coil 13. The first optical-fiber coil 11 has a first end A1 and a second end A2. The second optical-fiber coil 12 has a first end B1 and a second end B2. The third optical-fiber coil 13 has a first end C1 and a second end C2.

Let's note respectively:
T1 the transit time of the group velocity in the first coil 11,
T2 the transit time of the group velocity in the second coil 12, and
T3 the transit time of the group velocity in the third coil 13.

The transit times T1, T2 and T3 are all different two by two. In an exemplary embodiment: T1≤0.9×T2 and 1.1×T2≤T3. For example, the coils 11, 12, 13 are manufactured from a same optical fiber, but have different lengths.

The three-axis interferometric system of FIG. 6 further includes a third optical separator 31 arranged on the optical path of the first modulated beam 150 and a fourth optical separator 32 arranged on the optical path of the second modulated beam 250. Advantageously, for a system with three optical-fiber coils 11, 12 and 13, the third and fourth optical separator each include a one-entry and three-exit optical separator. A one-entry and three-exit optical separator may be consisted of a 1×3 coupler or, as an alternative, of a 3×3 coupler in which only one of the three entries is used. As an alternative, the third and/or fourth optical separator may be formed of a series of 2×2 couplers arranged according to a tree structure, so as to spatially separate the modulated beams into three beams. Advantageously, the third optical separator 31 and the fourth optical separator 32 are each consisted of a 1*3 coupler and are integrated on a planar integrated optical circuit made of lithium niobate, which also includes the optical modulator 4, the first optical separator 3 and a polarizing waveguide 5.

The optical path of entry of the third optical separator 31 is connected by optical fiber to a path of exit of the optical modulator 4 and the optical path of entry of the fourth optical separator 32 is connected by optical fiber to another path of exit of the optical modulator 4.

One of the three optical paths of exit of the third optical separator 31 is connected to the first end A1 of the first optical-fiber coil 11, the second optical path of exit of the third optical separator 31 is connected to the first end B1 of the second optical-fiber coil 12 and the third optical path of exit of the third optical separator 31 is connected to the first end C1 of the third optical-fiber coil 13.

Similarly, one of the three optical paths of exit of the fourth optical separator 32 is connected to the second end A2 of the first optical-fiber coil 11; the second optical path of exit of the fourth optical separator 32 is connected to the second end B2 of the second optical-fiber coil 12 and the third optical path of exit of the fourth optical separator 32 is connected to the second end C2 of the third optical-fiber coil 13.

Hence, the third optical separator 31 spatially separates the first modulated beam 150 into a first fraction of the first modulated beam 151, a second fraction of the first modulated beam 152 and a third fraction of the first modulated beam 153. The first fraction of the first modulated beam 151 is injected at the first end A1 of the first optical-fiber coil 11. Simultaneously, the second fraction of the first modulated beam 152 is injected at the first end B1 of the second optical-fiber coil 12 and the third fraction of the first modulated beam 153 is injected at the first end C1 of the third optical-fiber coil 13. The first, second and third fractions of the first modulated beam 151, 152 and 153 are hence applied simultaneously and in parallel at the first ends A1, respectively B1, C1, of the three optical-fiber coils 11, respectively 12 and 13. Preferably, the third optical separator 31 is equi-distributed in intensity so that the first, second and third fractions of the first modulated beam 151, 152 and 153 have the same intensity. However, a difference of intensity between the beams 151, 152 and 153 do not alter notably the operation of the interferometric system.

Similarly, the fourth optical separator 32 separates the second modulated beam 250 into a first fraction of the second modulated beam 251, a second fraction of the second modulated beam 252 and a third fraction of the second modulated beam 253. The first fraction of the second modulated beam 251 is applied at the second end A2 of the first optical-fiber coil 11. Simultaneously, the second fraction of the second modulated beam 252 is applied at the second end B2 of the second optical-fiber coil 12 and the third fraction of the second modulated beam 253 is applied at the second end C2 of the third optical-fiber coil 13. The first, second and third fractions of the second modulated beam 251, 252, 253 are hence applied simultaneously and in parallel at a second end A2, respectively B2 and C2, of the three optical-fiber coil 11, respectively 12 and 13. Preferably, the first, second and third fractions of the second modulated beam 261, 262, 263 have the same amplitude.

Hence, the first fraction of the first modulated beam 151 and the first fraction of the second modulated beam 251 travel through the first coil 11 with a transit time T1 in counter-propagating directions. Simultaneously, the second fraction of the first modulated beam 152 and the second fraction of the second modulated beam 252 travel through the second coil 12 with at transit time T2 in counter-propagating directions. Likewise, simultaneously, the third fraction of the first modulated beam 153 and the third fraction of the second modulated beam 253 travel through the third coil 13 with a transit time T3 in counter-propagating directions.

The third optical separator 31 receives on the one hand, exiting from the first end A1 of the first coil 11, the first fraction of the second modulated beam 261 having travelled through the first coil 11, on the other hand, from the first end B1 of the second coil 12, the second fraction of the second modulated beam 262 having travelled through the second coil 12, and finally, from the first end C1 of the third coil 13, the third fraction of the second modulated beam 263 having travelled through the third coil 13. The third optical separator 31 recombines by superimposition these three beams 261, 262, 263 having travelled through the first coil 11, the second coil 12 and the third coil 13, respectively, to form a recombined beam 260. The differences of transit time between the fiber coils 11, 12 and 13 are higher than the decoherence time of the source, so that these three beams 261, 262, 263 do not interfere with each other.

The fourth optical separator 32 receives, on the one hand, exiting from the second end A2 of the first coil 11, the first fraction of the first modulated beam 161 having travelled through the first coil 11, on the other hand, from the second end B2 of the second coil 12, the second fraction of the first modulated beam 162 having travelled through the second coil 12, and finally, from the second end C2 of the third coil 13, the third fraction of the first modulated beam 163 having travelled through the third coil 13. The fourth optical separator 32 recombines by superimposition, with no interference, these three beams 161, 162, 163 having travelled through the first coil 11, the second coil 12 and the third coil 13, respectively, to form a recombined beam 160.

The first optical coupler-separator 3 receives the recombined beam 160 and the recombined beam 260. The optical coupler-separator 3 superimposes the recombined beams 160 and 260 to form a single interferometric beam 330. More precisely, the interferometric beam 330 is formed by the superimposition of the recombinations, respectively, of the beams 161 and 262 having travelled through the first coil 11 with a transit time T1 in opposite directions, of the beams 162 and 262 having travelled through the second coil 12 with a transit time T2 in opposite directions, and finally of the beams 163 and 263 having travelled through the third coil 13 with a transit time T3 in opposite directions. The second optical source separator 6 directs the interferometric beam 330 exiting from the three optical-fiber coils 11, 12 and 13 towards the photodetector 2. The interferometric beam 330 is herein a composite beam comprising an interferometric beam component associated with the first coil, another interferometric beam component associated with the second coil, and still another interferometric beam component associated with the third coil. The detector 2 transmits a detected signal 730 to the signal-processing system 800. The processing system 800 digitizes and numerically processes the detected signal 730 so as to extract a measurement 280 of the Sagnac phase shift associated with each of the optical-fiber coils, respectively, similarly to the method of demodulation described in relation with FIG. 5.

Advantageously, a rectangular-wave modulation at a modulation frequency $f_m$ is applied, and the rising fronts are detected in the detected interferometric signal at determined instants, as a function of the respective transit times T1, T2 and T3.

In the case of an interferometric system with three optical-fiber coils and a rectangular modulation signal, an interferometric signal formed of a series of steps is detected. These steps are measured at different instants. Advantageously, 1+2*3=7 acquisitions per period of modulation are performed, the time position of these acquisitions being determined by the position of the step fronts. For example, for a system with three optical-fiber coils, similarly to the method described in relation with FIG. 5, it is recorded in the detected interferometric signal three rising fronts at determined instants t1, t3, t5 then a falling front at a determined instant to, and finally three rising fronts at determined instants t2, t4 and t6. More particularly, the instants t0, t1, t2, t3, t4, t5 and t6 are determined as a function of the respective transit times T1, T2 and T3 in the three coils and as a function of the modulation period and cyclic ratio.

The different Sagnac phase shifts associated with the different optical-fiber coils are deduced by linear combinations of the 7 acquisitions.

Advantageously, a rising and/or falling front detection mode is used to trigger the acquisitions and to record the instant of arrival and the height of each rising and/or falling front. Hence, the acquisition of the interferometric signal is not performed at predetermined instants or at a predefined frequency, but at instants t0, t1, t2, t3, t4 that are triggered by the arrival of rising and/or falling fronts to the detector.

FIG. 7 schematically shows an interferometric system with three optical-fiber coils according to a preferred embodiment of the invention, wherein a multifunction integrated optical circuit 16 integrates the first optical separator 3, the second optical separator 6 and the optical phase modulator 4. 1×3 splitting couplers form the third optical separator 31 and the fourth optical separator.

Method of Modulation-Demodulation in a Three-Axis Interferometric System First Variant Tm/2>Ti FIGS. 8(a)-8(e) show the implementation of a method of modulation and demodulation on a three-axis interferometric system as described in relation with FIG. 7.

In FIG. 8, the modulation is a rectangular-wave modulation having a modulation frequency fm and, equivalently, a period of modulation Tm=1/fm, the half-period of modulation being higher than the transit time in the three coils:

$T1<T2<T3<Tm/2$

FIG. 8(a) shows the intensity I1, respectively, I2, I3, of the interferometric signal as a function of the phase shift Lip between two counter-propagating waves in the first coil 11, respectively in the second coil 12 and in the third coil 13.

The first coil 11 is sensitive to a Sagnac phase shift $\phi_1$ about its axis; the second coil 12 is sensitive to a Sagnac phase shift $\phi_2$ about its axis; and the third coil 13 is sensitive to a Sagnac phase shift $\phi_3$ about its axis.

FIG. 8(*b*) shows, as a function of time t, the Sagnac phase shift $\phi_1$, respectively $\phi_2$, $\phi_3$, about the axis of the first coil 11, respectively of the second coil 12 and the third coil 13. The respective transit times T1, T2 and T3 being all different, for a same modulation Vmod applied simultaneously and in parallel to the beams travelling through the three coils, the Sagnac phase-shift signals $\phi_1$, respectively $\phi_2$ and $\phi_3$, arrive to the detector with time offset between each other. More precisely, the Sagnac phase shift $\phi_1$ of the first coil 11 occurs in first, before the Sagnac phase shift $\phi_2$ of the second coil 12, and finally the Sagnac phase shift $\phi_3$ of the third coil 13.

In this example, the amplitude of the rotation viewed by the second coil 12 is lower than the amplitude of the rotation viewed by the third coil 13, which is itself lower than the amplitude of the rotation viewed by the first coil 11, so that:

$$\phi 2 < \phi 3 < \phi 1$$

FIG. 8(*c*) shows the chronogram of the rectangular-wave modulation voltage of cyclic ratio 1/2 applied to the optical modulator 4 to introduce a time-modulated optical phase shift between the first modulated beam 150 and the second split beam 250, this modulation being applied simultaneously at the entry of the three coils.

FIG. 8(*d*) shows in superimposition the chronogram of the power P1, respectively P2, P3, of the interferometric signal of the first coil, respectively of the second coil and the third coil.

FIG. 8(*e*) shows the chronogram of the power of the detected interferometric signal that is the sum of the powers P1, P2 and P3 of FIG. 8(*d*).

Advantageously, 1+2*3 acquisitions, i.e. 7 acquisitions, per period of modulation are performed for a system with three optical-fiber coils. The time position of these acquisitions is determined by the position of the fronts and is not regularly distributed over the period of modulation.

In FIG. 8(*e*), it is observed that the detected power has levels A, B, C, D, E, F, G at instants determined as a function, on the one hand, of the respective transit times, T1, T2, T3 in the coils, and on the other hand, of the period of modulation and of the cyclic ratio of modulation.

It is shown that the Sagnac phase shifts in the three coils are calculated by linear combinations from the measured levels A-G.

For example, the respective Sagnac phase shifts are deduced for each coil:

$$\phi 1 = A - E - B + F$$

$$\phi 2 = B - F + C + G$$

$$\phi 3 = C - G.$$

It is observed from the above equations that, in the case of a three-axis interferometer, the measurement of the phase shift of each axis is independent from the measurement of the phase shifts on the two other axes.

From the point of view of the Sagnac phase shifts, only 6 over the 7 measurements are used in the above formulas, as the measurement of the level D does not intervene in the above phase-shift calculations.

Second Variant Tm/2<Ti

FIGS. 9(*a*)-9(*e*) show the implementation of a method of modulation and demodulation on a three-axis interferometric system as described in relation with FIG. 7.

In FIG. 9, the modulation is a rectangular-wave modulation having a modulation frequency fm, hence a period of modulation Tm=1/fm, the half-period of modulation being lower than the transit time in the three coils:

$$Tm/2 < T1 < T2 < T3.$$

FIG. 9(*a*) shows the intensity 11, respectively 12, 13, of the interferometric signal as a function of the phase shift $\Delta\phi$ between two counter-propagating waves in the first coil 11, respectively in the second coil 12 and in the third coil 13. The first coil 11 is sensitive to a Sagnac phase shift $\phi_1$ about its axis; the second coil 12 is sensitive to a Sagnac phase shift $\phi_2$ about its axis; and the third coil 13 is sensitive to a Sagnac phase shift $\phi_3$ about its axis.

FIG. 9(*b*) shows, as a function of time t, the Sagnac phase shift $\phi 1$, respectively $\phi 2$, $\phi 3$, about the axis of the first coil 11, respectively the second coil 12 and the third coil 13. The respective transit times T1, T2 and T3 being all different from each other, for a same rectangular-wave modulation Vmod applied simultaneously and in parallel to the beams travelling through the three coils, the Sagnac phase-shift signals $\phi 1$, respectively $\phi 2$ and $\phi 3$, arrive on the detector with time offset between each other. More precisely, the Sagnac phase shift $\phi 1$ of the first coil 11 occurs first, before the Sagnac phase shift $\phi 2$ of the second coil 12, and finally the Sagnac phase shift $\phi 3$ of the third coil 13.

In the example shown, the amplitude of the rotation viewed by the second coil 12 is lower than the amplitude of the rotation viewed by the third coil 13, which is itself lower than the amplitude of the rotation viewed by the first coil 11, so that: $\phi 2 < \phi 3 < \phi 1$.

FIG. 9(*c*) shows the chronogram of the rectangular-wave modulation voltage of cyclic ratio 1/2 applied on the optical modulator 4 to introduce a time-modulated optical phase shift between the first modulated beam 150 and the second split beam 250, this modulation being applied simultaneously at the entry of the three coils.

FIG. 9(*d*) shows in superimposition the chronogram of the power P1, respectively P2, P3, of the interferometric signal of the first coil, respectively of the second coil and of the third coil.

FIG. 9(*e*) shows the chronogram of the power of the detected interferometric signal that is the sum of the powers P1, P2 and P3 of FIG. 9(*d*).

Similarly to FIG. 8, it is observed in FIG. 9(*e*) that the detected power shows levels A, B, C, D, E, F, G at instants determined as a function, on the one hand, of the respective transit times T1, T2, T3 in the three coils, and on the other hand, of the period of modulation and of the cyclic ratio of modulation. The instants of acquisition corresponding to the levels A-G are hence different from each other, on the one hand, in the case of FIG. 8(*e*), where Tm/2>Ti, and on the other hand, in the case of FIG. 9(*e*), where Tm/2<Ti, where Ti represents the transit time in the coils (Ti=T1, T2 or T3).

Advantageously, 1+2*3 acquisitions, i.e. 7 acquisitions, per period of modulation are performed for a system with three optical-fiber coils. The time position of these acquisitions is determined by the position of the fronts and is not regularly distributed over the period of modulation.

It is shown that the Sagnac phase shifts in the three coils are calculated by linear combinations from the measured levels A-G.

The same formula as for FIG. 8(*e*) is applied to deduce therefrom the respective Sagnac phase-shifts for each coil:

$$\phi 1 = A - E - B + F$$

$$\phi 2 = B - F + C + G$$

$$\phi 3 = C - G.$$

Indeed, the modification of the duration Tm affects only the duration of the levels A and E, but does not affect the duration of the other levels, nor the height of the levels A-G.

It is observed that, for the measurements of the Sagnac phase shifts, only 6 components are sufficient, as the measurement of D does not intervene in the above formulas.

A two- or three-axis interferometric system and the method of modulation/demodulation of an interferometric signal described in relation with FIGS. 4 to 9 can be generalized to an interferometric system including more than three optical-fiber coils connected in parallel to a single source, a single detector and a single shared optical phase modulation device, provided that the different optical-fiber coils have different transit times, and that the signal-processing system is adapted to detect the components of the composite interferometric signal as a function of the respective transit times of each of the optical-fiber coils.

In the case of a system with N optical-fiber coils, 2*N acquisitions per period of modulation are performed, the time position of these acquisitions being determined, or triggered, by the position of the step fronts in the detected interferometric signal. The different Sagnac phase shifts associated with the different optical-fiber coils are deduced by linear combinations of the 2*N acquisitions.

The phase modulation frequency $f_m$ may be chosen either:
lower than the proper frequency of each of the optical-fiber coils, which makes it possible to use a slower, and less expensive, electronic system;
higher than the proper frequency of each of the optical-fiber coils, which allows a better dynamic of measurement; or equal to the proper frequency of one of the optical-fiber coils.

The invention claimed is:

1. A multi-axis fiber optic interferometric system, including:
a shared light source adapted to emit a source beam having a constant intensity as a function of time;
a plurality of N optical-fiber coils, each coil forming a ring optical path about an axis;
a first optical coupler-separator adapted to spatially separate the source beam into a first split beam and a second split beam;
shared phase modulator adapted to apply a time-modulated phase shift, having a period of modulation $T_m$, between the first and the second split beams and to form a first phase modulated beam and a second phase modulated beam;
a shared photodetector; and
a shared signal-processing system;
wherein:
the shared phase modulator applying simultaneously at the entry of the N coils a rectangular-wave phase modulation consisting of a rising front at instant t=0 and a falling front in between instants t=0 and $T_m$ at each period of modulation $T_m$;
the N optical-fiber coils are connected in parallel, so as to inject simultaneously a fraction of the first phase modulated beam at a first end of each coil and a fraction of the second phase modulated beam at a second end of each coil, said N optical-fiber coils having respective transit times T1, T2, . . . TN for modulated waves that are all different from each other;
the first optical coupler-separator being adapted to recombine said fractions of the first phase modulated beam and said fractions of the second phase modulated beam having travelled counter-propagatively through the N coils to form an interferometric beam; and
the signal-processing system are adapted to process the interferometric signal detected by the photodetector as a function of the respective transit times T1, T2, . . . TN in the different coils, the interferometric signal detected comprising at least 2*N components, the 2*N components having time positions triggered by the position of rising fronts and/or falling fronts in the interferometric signal detected during a same period of modulation $T_m$.

2. The multi-axis fiber optic interferometric system according to claim 1, further comprising:
a second optical coupler-separator arranged between the shared light source and the shared photodetector;
third optical coupler-separator arranged on the optical path of the first phase modulated beam between the phase modulator and the first ends of each of the N optical-fiber coils;
fourth optical coupler-separator arranged on the optical path of the second phase modulated beam between the phase modulator and the second ends of each of the N optical-fiber coils;
the third optical coupler-separator and the fourth optical coupler-separator each having at least one entry and N exits so as to transmit simultaneously and in parallel a fraction of the first phase modulated beam at the first end of each of the N optical-fiber coils and a fraction of the second phase modulated beam at the second end of each of the N optical-fiber coils and so that said fractions of the first phase modulated beam and said fractions of the second phase modulated beam propagate in opposite directions in each of said coils.

3. The multi-axis fiber optic interferometric system according to claim 1, wherein the signal-processing system is adapted to record a series of 2*N components of the detected signal at instants determined as a function of the respective transit times T1, T2, . . . TN respectively associated with each of the N optical-fiber coils and to extract therefrom at least N measurements of Sagnac phase shift respectively associated with each of the N optical-fiber coils from said series of components.

4. The fiber optic interferometric system according to claim 2, further including a planar integrated optical circuit including:
a. the first optical coupler-separator;
b. the shared phase modulator; and
c. the third and fourth optical coupler-separator.

5. The fiber optic interferometric system according to claim 4, wherein the first optical coupler-separator includes a Y junction.

6. The fiber optic interferometric system according to claim 1, including a digital-to-analog converter adapted to apply a modulation voltage to the shared phase modulator so as to generate a phase shift modulated at a modulation frequency $f_m$.

7. The fiber optic interferometric system according to claim 2, wherein the third optical coupler-separator and, respectively, the fourth optical coupler-separator, comprise one or several 2×2 couplers arranged in series, a 1×N coupler or a 3×3 coupler.

8. The fiber optic interferometric system according to claim 1, wherein the transit times T1, T2 and T3 are defined as follows: T1≤0.9×T2 and 1.1×T2≤T3.

9. A method of interferometric measurement of a plurality of phase shifts in an interferometric system comprising N optical-fiber coils optically coupled in parallel to a shared source, a shared phase modulator and a shared detector, said N optical-fiber coils having respectively transit times T1, T2, ... TN for modulated waves that are all different from each other, the method comprising the following steps:
- spatial separation of a source beam having a constant intensity as a function of time into a first split beam and a second split beam;
- simultaneous application at the entry of the N coils of a rectangular wave time-modulated phase shift having a period of modulation $T_m$ between the first split beam and the second split beam to form a first phase modulated beam and a second phase modulated beam, the rectangular wave time-modulated phase shift consisting of a rising front at instant t=0 and a falling front in between instants t=0 and $T_m$ at each period of modulation $T_m$;
- spatial separation of the first phase modulated beam into N fractions of the first phase modulated beam and spatial separation of the second phase modulated beam into N fractions of the second phase modulated beam;
- simultaneous and parallel injection on the plurality of optical-fiber coils, respectively, of a fraction of the first phase modulated beam at the first end of each optical-fiber coil and of a fraction of the second phase modulated beam at the second end of said optical-fiber coil, so that each of said fractions of the first phase modulated beam and each of said fractions of the second phase modulated beam travel respectively in counter-propagating directions through an optical-fiber coil with, respectively, a different transit time T1, T2, ... TN for each of the N optical-fiber coils;
- optical recombination of the N fractions of first phase modulated beam having each travelled through one optical-fiber coil to form a first recombined beam;
- optical recombination of the N fractions of second phase modulated beam having each travelled through one optical-fiber coil to form a second recombined beam;
- recombination of the first recombined beam and of the second recombined beam to form an interferometric beam time modulated as a function of the respective transit times T1, T2, ... TN in the different optical-fiber coils;
- detection of the interferometric beam and generation of an interferometric electronic signal;
- detection and recording of at least 2*N components of the interferometric electronic signal during a same period of modulation $T_m$ at a series of at least 2*N instants triggered by the position of rising fronts and/or falling fronts in the interferometric signal detected as a function of the respective transit times T1, T2, ... TN in the optical-fiber coils;
- processing of the at least 2*N components of the interferometric electronic signal recorded at the preceding step to deduce therefrom a plurality of N measurements of Sagnac phase shift associated with each of the N optical-fiber coils, respectively, for the same period of modulation $T_m$.

10. The method of interferometric measurement according to claim 9, wherein the modulation frequency $f_m$ is equal to the proper frequency $f_p$ of one of the optical-fiber coils, said coil having a transit time $T_i$, and the proper frequency being defined as follows: fp=1/(2·Ti).

11. The method of interferometric measurement according to claim 9, wherein the modulation frequency $f_m$ is lower than the proper frequency of all the optical-fiber coils.

12. The method of interferometric measurement according to claim 9, wherein the modulation frequency $f_m$ is higher than the proper frequency of all the optical-fiber coils, the modulation frequency being lower than:

$$f_m \leq \frac{1}{2 \times (T_{MAX} - T_{min})}$$

where $T_{MAX}$ represents the maximum of the transit times T1, T2, ... TN of all the coils and $T_{min}$ represents le minimum of the transit times T1, T2, ... TN of all the coils.

13. The method of interferometric measurement according to claim 9, wherein the step of detection of the interferometric beam and/or of recording of at least 2*N components of the interferometric electronic signal comprises the detection and the recording of rising and/or falling fronts at instants determined as a function of the respective transit times T1, T2, ... TN in the different optical-fiber coils and of the modulation frequency.

14. The method of interferometric measurement according to claim 9, wherein the step of processing of the at least 2*N recorded components of the interferometric electronic signal comprises operations of linear combination of said at least 2*N components to deduce therefrom at least the plurality of N measurements of Sagnac phase shift associated with each of the N optical-fiber coils, respectively.

15. The multi-axis fiber optic interferometric system according to claim 2, wherein the signal-processing system is adapted to record a series of 2*N components of the detected signal at instants determined as a function of the respective transit times T1, T2, ... TN respectively associated with each of the N optical-fiber coils and to extract therefrom at least N measurements of Sagnac phase shift respectively associated with each of the N optical-fiber coils from said series of components.

16. The fiber optic interferometric system according to claim 2, including a digital-to-analog converter adapted to apply a modulation voltage to the shared phase modulator so as to generate a phase shift modulated at a modulation frequency $f_m$.

17. The fiber optic interferometric system according to claim 2, wherein the transit times T1, T2 and T3 are defined as follows: T1≤0.9×T2 and 1.1×T2≤T3.

18. The method of interferometric measurement according to claim 9, wherein the step of detection of the interferometric beam and/or of recording of at least 2*N components of the interferometric electronic signal comprises the detection and the recording of rising and/or falling fronts at instants determined as a function of the respective transit times T1, T2, ... TN in the different optical-fiber coils and of the modulation frequency.

19. The method of interferometric measurement according to claim 9, wherein the step of processing of the at least 2*N recorded components of the interferometric electronic signal comprises operations of linear combination of said at least 2*N components to deduce therefrom at least the plurality of N measurements of Sagnac phase shift associated with each of the N optical-fiber coils, respectively.

* * * * *